'United States Patent Office 3,328,446
Patented June 27, 1967

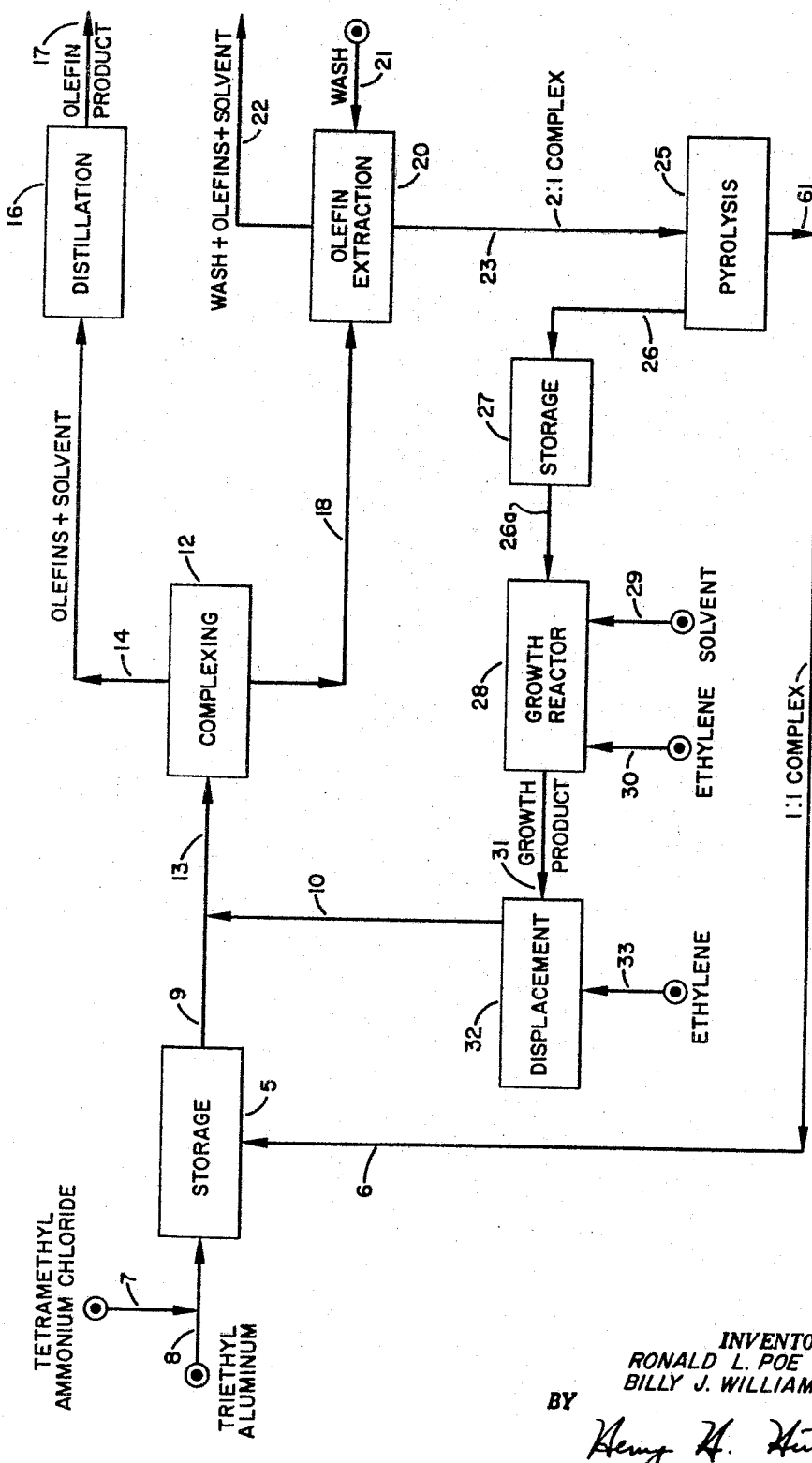

3,328,446
COMPOSITION AND PROCESS FOR SEPARATION OF TRIALKYLALUMINUM COMPOUNDS
Ronald L. Poe and Billy J. Williams, Ponca City, Okla., assignors to Continental Oil Company, Ponca City, Okla., a corporation of Delaware
Filed Nov. 14, 1962, Ser. No. 237,588
11 Claims. (Cl. 260—448)

This invention relates to novel complexes of lower alkylammonium chlorides and low molecular weight trialkylaluminum compounds and method of separating low molecular weight trialkylaluminum compounds from hydrocarbons or other types of aluminum compounds.

The "growth" reaction involves the interaction of a low molecular weight mono-olefin and a low molecular weight trialkylaluminum. By virtue of the reaction, the mono-olefin adds to the alkyl radicals of the aluminum compound in multiples to produce relatively higher molecular weight aluminum compounds. The growth product can be used as a starting material for the production of other useful materials such as, for example, relatively high molecular weight alpha-olefins and alcohols. With regard to the production of alpha-olefins, there is lacking a satisfactory method of separating the alpha-olefins from the product containing it. For this reason, the production of alpha-olefins from the growth product has been undesirably costly and inefficient. Extensive investigations have been made to determine a cheap and efficient method of producing alpha-olefins from the growth product. Quite unexpectedly, we have discovered a method of accomplishing this objective, which is commercially attractive because of the ease and economy with which the alpha-olefins are produced.

Accordingly, an object of this invention is to provide a method of producing alpha-olefins from a growth product.

Another object of this invention is to provide an effective method of separating alpha-olefins from relatively low molecular weight aluminum compounds with which it is combined.

Other objects and advantages of this invention will become apparent from the following description and explanation thereof.

In its broad aspect, the invention comprises complexes of low molecular weight tetra alkylammonium chlorides with low molecular weight trialkylaluminum compounds.

In one aspect of the invention, the foregoing objects are achieved broadly by a process which comprises separating a low molecular weight trialkylaluminum from various materials, including (1) displacement product containing alpha-olefins, (2) non-olefinic hydrocarbons and (3) dialkylaluminum alkoxide by contacting the material with a complexing agent for the low molecular weight trialkylaluminum and thereafter separating the complex containing trialkylaluminum from said material. The complexing agent which is employed is a compound having the formula $R_nMX$ or a complex of $R_nMX$ and low molecular weight trialkylaluminum in a 1:1 molar ratio, wherein R is alkyl, M is an element selected from the group consisting of nitrogen, arsenic, phosphorus, sulfur, selenium and tellurium; X is a halogen and $n$ is 3 or 4 depending on the particular element M. The preferred complexing agents are the tetraalkylammonium halides.

In another aspect of the invention, a displacement product including alpha-olefins containing an average of about 4 to 30 carbon atoms in admixture with a trialkylaluminum which contains alkyl radicals having an average of about 2 to 5 carbon atoms, but fewer average carbon atoms than is contained by the alpha-olefins, is treated with a complex of a tetraalkylammonium halide in which the alkyl radicals contain an average of about 1 to 5 carbon atoms and a trialkylaluminum in which the alkyl radicals contain an average of 2 to 5 carbon atoms, the molar ratio of the latter to the former in the complex is 1:1, thereby producing a complex in which the aforesaid molar ratio is 2:1.

In yet another aspect of the invention, the 2:1 complex is subjected to a heat treatment in order that it can be decomposed into trialkylaluminum and the 1:1 complex. The 1:1 complex is then reused for the treatment of the displacement product as previously described.

In still another aspect of the invention, the 2:1 complex which is separated from the alpha-olefins may contain a small amount of alpha-olefins as contaminant. This contaminant can be readily removed from the 2:1 complex by treatment with a paraffinic hydrocarbon containing about 4 to 30 carbon atoms, whereby the alpha-olefins are dissolved into the wash hydrocarbon leaving the 2:1 complex substantially free of contamination.

In other aspects of the invention, the complexing agents hereinbefore described are employed in the separation of hydrocarbon solvents, particularly saturated hydrocarbons from low molecular weight trialkylaluminum and in the separation of dialkylaluminum alkoxides from low molecular weight trialkylaluminum.

The growth reaction involves the reaction between a low molecular weight mono-olefin or alkylene such as ethylene, propylene, butene, etc. with a low molecular weight aluminum trialkyl, such as for example, a trialkyl-aluminum having the alkyl substituents containing from about 2 to 4 carbon atoms. The resultant growth product comprises a trialkyl compound in which the alkyl groups vary widely in molecular weight. The growth reaction can be illustrated by the following equation:

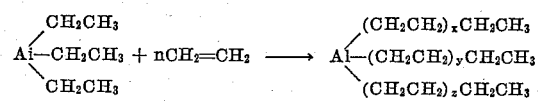

wherein $x$, $y$, $z$ represent integers ranging from 0 to about 14 and $x+y+z$ is equal to small $n$. The growth reaction can be carried out by passing the mono-olefin such as ethylene through trialkylaluminum such as triethylaluminum, preferably in the presence of a diluent under a variety of reaction conditions. The temperature of reaction can be from about 65° to 150° C. and at a pressure of about 200 to 5000 p.s.i.g., and more usually a temperature of about 90° to 120° C. and at a pressure of about 1000 to 3500 p.s.i.g.

The growth reaction provides a statistical distribution of alkyl chain lengths characterized by the Poisson relationship which can be expressed as follows:

$$P_{(n)} = \frac{m^n e^{-m}}{n'}$$

wherein $P_{(n)}$ represents the probability that a certain hydrocarbon radical will be formed by $n$ additions of ethylene to the aluminum ethyl bond originally present and $m$ is the mean number of additions of ethylene per growing chain. The following table contains an illustration of a type of distribution which is obtained in the growth reaction:

TABLE

| Alkyl group: | Weight percent |
|---|---|
| $C_2$ | 0.04 |
| $C_4$ | 0.23 |
| $C_6$ | 3.37 |
| $C_8$ | 11.79 |
| $C_{10}$ | 20.42 |
| $C_{12}$ | 22.63 |
| $C_{14}$ | 18.20 |

TABLE—Continued

| Alkyl group: | Weight percent |
| --- | --- |
| $C_{16}$ | 11.61 |
| $C_{18}$ | 6.21 |
| $C_{20}$ | 3.47 |
| $C_{22}$ | 1.25 |
| $C_{24}$ | 0.49 |
| $C_{26}$ | 0.18 |
| $C_{28}$ | 0.05 |

The growth reaction may be carried out in a substantially non-olefinic (inert) diluent which can be paraffin, cycloparaffin, aromatic hydrocarbon or hydrocarbon fraction, such as, for example, isooctane, cyclohexane, benzene, xylene, kerosene, alkylate, naphtha, and the like. The diluent aids in controlling the temperature of the reaction which is exothermic and also serves as a solvent for the growth product. The diluent employed in the growth reaction can also be the alpha-olefin which was described hereinabove.

The growth product has alkyl substituents containing about 2 to 40 carbon atoms or higher. It is subjected to a displacement reaction with a low molecular weight mono-olefin containing about 2 to 5 carbon atoms. The low molecular weight mono-olefins may be, for example, ethylene, propylene or butene. In the displacement reaction, the mono-olefin is substituted for the high molecular weight alkyl substituents of the aluminum compound. As a consequence, the displacement reaction product comprises a low molecular weight trialkyl in which the alkyl substituents contain about 2 to 5 carbon atoms and the alpha-olefins contain about 2 to 40 carbon atoms or higher.

The displacement reaction can be effected in the absence of catalyst by the atomization technique. In such a method, the feed is atomized through well-known means as it is introduced into the displacement reaction zone. The temperature is maintained below about 370° C., more usually between about 40° C. and about 370° C., preferably between about 200° C. and about 290° C. The reaction pressure is maintained below about 200 p.s.i.a. and can be in the subatmospheric range, for example, as low as 1 p.s.i.a. Preferably, the pressure of the reaction varies between about 20 and about 100 p.s.i.a. The time of the reaction may be from about 30 seconds to about 15 minutes, more usually about 1 minute to about 10 minutes, and preferably from about 3 minutes to about 7 minutes.

With regard to the means of spraying the aluminum alkyls, various techniques can be employed. For example, the conventional hollow cone nozzles can be employed and atomization is obtained by maintaining a pressure differential across the nozzle. In some instances, the atomization of aluminum alkyl is aided by the use of an atomizing gas, which for the purpose of the present invention can be the alkylene, which is employed in the displacement reaction. Introducing the aluminum alkyls at an elevated temperature is desirable because of the reduction in viscosity. In general, the aluminum alkyls are preheated to a temperature below the reaction temperature, for example, up to about 350° C. Prior to atomization, preheating of the aluminum alkyls is preferably carried out to provide a temperature of about 90° C. to 160° C.

In a noncatalytic operation where the feed to the displacement reaction is not atomized, it is preferred to employ a temperature of about 200° C. to 320° C. for the displacement reaction. The displacement reaction would then preferably be conducted at a pressure of about 150 to 300 p.s.i.g., and the time of reaction could vary from about 0.1 to 10 seconds.

The displacement reaction can also be effected in the presence of a catalyst. For this purpose, it is preferred that the temperature of reaction vary from about 50° to 150° C. and at a pressure of about 150 to 1500 p.s.i.g. The time of reaction may be from about 1 to 30 minutes. A suitable catalyst for use in the reaction may include any one of the so-called reduction catalysts such as nickel, cobalt, palladium and iron compounds. The preferred catalyst is a nickel compound which will react with the trialkylaluminum compound. Specific nickel catalysts include finely divided metallic nickel, Raney nickel, nickel acetylacetonate, nickel naphthenate, etc. The amount of catalyst employed in the reaction can be varied greatly however, usually about 0.001 to 0.1 percent, based on the weight of the growth product, are employed.

In the displacement reaction, the quantity of low molecular weight mono-olefin or alkylene employed is governed to effect complete replacement of the alkyl substituents in the high molecular weight aluminum alkyl. Accordingly, a stoichiometric amount of the low molecular weight mono-olefin can be used, however, it is preferred to employ a stoichiometric excess of about 200 to 2000 mole percent of the low molecular weight mono-olefin per mole of growth product for thermal displacement and about 10 to 100 mole percent for catalytic displacement.

As pointed out previously, the invention in its broad aspect is directed to novel complexes of low molecular weight tetraalkylammonium chlorides with low molecular weight trialkylaluminum compounds. These complexes can be defined by the formula:

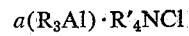

$$a(R_3Al) \cdot R'_4NCl$$

wherein R is an alkyl radical containing 2 to 5 carbon atoms, $a$ is selected from 1 and 2, R' is an alkyl radical containing 1 to 3 carbon atoms, and R+R' does not exceed 6 carbon atoms. Specific examples of complexes contemplated within the scope of the invention are 2 triethylaluminum·tetramethylammonium chloride, tripentylaluminum·tetramethylammonium chloride, triethylaluminum·tetrapropylammonium chloride, 2 tripropylaluminum·tetraethylammonium chloride, 2 triisobutylaluminum·tetramethylammonium chloride, tributylaluminum·tetraethylammonium chloride, 2 triethylaluminum·tetrapropylammonium chloride, triethylaluminum·tetramethylammonium chloride, and triisobutylaluminum·tetramethylammonium. While any of the complexes covered by the generic formula are within the scope of the invention, the preferred complexes are those which employ tetramethylammonium chloride and the alkyl aluminum compounds containing not more than 4 carbon atoms.

The complexes of this invention are characterized by their substantial insolubility in aliphatic compounds, that is, paraffinic and olefinic compounds. For example, the 1:1 and 2:1 complexes of aluminum triethyl and tetramethylammonium chloride have a solubility of less than 1 part of complex per 100 parts of solvent. The complexes are also characterized by their high degree of thermal stability. For example, the 2:1 complex of aluminum triethyl and tetramethylammonium chloride starts decomposing at 140° C. and 20 mm. of pressure. The complexes can exist either in the liquid or solid state depending upon their composition and the ambient temperature. The 1:1 complex of triethylaluminum and tetramethylaluminum chloride has a melting point of about 47° C. On the other hand, the 2:1 complex has a melting point of about 90° C. The general conditions of preparation of the complexes and the decomposition of the 2:1 complexes is set forth in the following detailed discussion, which is directed to the application of the afore-described complexes and other complexes in the process of the invention.

The complexing agents which are employed in carrying out the process of this invention are broadly defined by the formula $R_nMX$, wherein R is an alkyl radical; M is an element selected from the group consisting of nitrogen, arsenic, phosphorus, sulfur, selenium, and tellurium; X is a halogen; and $n$ is 3 or 4 depending on the particular element M. Preferably, the lower molecular weight alkyl radicals are employed, that is, those containing from 1 to 5 carbon atoms. As the length of the alkyl chain increases, the solubility of the complex in hydrocarbons also increases, whereby the degree of separation is reduced. Of the elements represented by M, all of which are non-metals, the preferred material is nitrogen; however, any of the other non-metals set forth also are effective as complexing agents for carrying out the process of the invention. Any of the halogens can be employed; however, the chlorides are preferred.

In order to more clearly and effectively describe the invention, the following discussion will be directed to the tetraalkylammonium halides. This is not, however, to be construed in any limited sense; and it is within the scope of the invention to employ any of the other alkyl non-metal halides within the scope of the formula set forth above. It is further to be understood that each of the other non-metals can be substituted for nitrogen in the specific examples of the complexing agents and complexes hereinafter set forth.

The displacement product containing alpha-olefins is treated with a tetraalkylammonium halide or a complex of tetraalkylammonium halide and trialkylaluminum. When the complex is employed, it is formed with a trialkylaluminum in which the alkyl radicals contain an average of about 2 to 5 carbon atoms. The sum of the average alkyl radicals of the two compounds in the complex is preferably not greater than 6. For the purpose of this specification and the appended claims, the term "average alkyl radical" is intended to mean the average of all the alkyl radicals which are present in the particular compound in question.

The reaction between the trialkylaluminum and the tetraalkylammonium halide takes place in a molar ratio of 1:1 and 2:1. This reaction may occur at a temperature of about 50° C. to 150° C., more usually about 50° C. to 100° C. The pressure of the reaction may be subatmospheric, atmospheric or superatmospheric. In general, however, the reaction occurs at atmospheric pressure. The formation of the complexes occurs within a reasonably short period of time; consequently they may form within a period of 0.25 to 30 minutes, more usually about 0.5 to 10 minutes. Specific examples of the tetraalkylammonium halide which can be used as a starting material for the preparation of the complex are tetramethylammonium chloride, tetramethylammonium iodide, tetraethylammonium fluoride, tetrabutylammonium bromide, tetraethylammonium chloride, tetrabutylammonium fluoride, tetrapropylammonium iodide, tetrapropylammonium chloride, etc. The trialkylaluminum which reacts with the tetraalkylammonium halide is, for example, triethylaluminum, tripropylaluminum, tributylaluminum, etc. Specific examples of complexes include 2 triethylaluminum-tetramethylammonium chloride, 2 triethylaluminum-tetramethylammonium iodide, 2 triamylaluminum-tetraethylammonium fluoride, 2 triisobutylaluminum-tetrabutylammonium bromide, 2 tributylaluminum-tetraethylammonium chloride, 2 tripropylaluminum-tetramethylammonium fluoride, 2 triisopropylaluminum-tetrapropylammonium fluoride, 2 triethylaluminum-tetrapropylammonium iodide, 2 triisopropylaluminum-tetrapropylammonium chloride, 2 triethylaluminum-tetraisobutylammonium chloride, 2 triisopropylaluminum-tetramethylammonium chloride, and 2 tripropylaluminum-tetraethylammonium bromide. Specific examples of compounds of the other non-metals which can be employed correspond to the compounds set forth above. It is to be understood of course that the specific examples also include the corresponding 1:1 complexes.

The 2:1 complex is readily decomposed by subjecting the complex to heat under conditions of subatmospheric pressure. In the decomposition reaction, the 2:1 complex is transformed into the 1:1 complex, with the release of one mole of trialkylaluminum for each mole of complex which is decomposed. The 1:1 complex does not readily decompose and requires conditions of temperature and pressure which result in pyrolysis of the trialkylaluminum. Since is is desirable to reuse the tetraalkylammonium halide in the process and this material is reuseable only in the form of the 1:1 complex, the process is ordinarily carried out by initially forming the 1:1 complex and thereafter operating the process with this complex rather than with the tetraalkylammonium halide. Accordingly, the following description and discussion are directed specifically to the use of the 1:1 complex; however, it is to be understood that the uncomplexed tetraalkylammonium halide can also be employed in the various embodiments of the invention.

The 1:1 complex hereinbefore described is reacted with the trialkylaluminum that is present in the displacement product. The trialkylaluminum contains alkyl radicals having an average of about 2 to 5 carbon atoms. The trialkylaluminum and the 1:1 complex can be reacted at a temperature of about 50° C. to 150° C., more usually about 50° C. to 100° C. The pressure of the reaction may vary widely so that it can be subatmospheric, atmospheric or superatmospheric. The time of reaction can be about 0.25 to 30 minutes, more usually about 0.5 to 10 minutes. The relative proportions of trialkylaluminum and 1:1 complex may vary considerably in the process of the present invention. The 1:1 complex may be employed in stoichiometric proportion to react with all of the trialkylaluminum or it may be used in excess so that the 1:1 complex is present in the final product along with the 2:1 complex. For the purpose of the present invention, it is preferred to use an excess of 1:1 complex in order to obtain the advantage of mass action. Usually about 1.05 to 1.20 moles of the 1:1 complex are employed for each mole of trialkylaluminum which is present in the displacement product.

The product of the treatment of the displacement product containing uncombined trialkylaluminum with the 1:1 complex is present in two phases. The upper phase consists chiefly of hydrocarbon materials, with or without, some trialkylaluminum and/or complex whereas the lower phase consists chiefly of the complex, with or without, small amounts of hydrocarbon, displacement catalyst, etc. In the even that the complex phase contains contaminant, this may be removed by treatment with a paraffinic hydrocarbon. For this purpose, the paraffinic hydrocarbon can contain from about 5 to 12 carbon atoms or higher. It is desirable that the paraffinic hydrocarbon have a fewer number of carbon atoms than the alpha-olefin. In this way, the paraffinic hydrocarbon can be separated easily from the alpha-olefin by distillation. It is preferred to employ a paraffinic hydrocarbon which contains about 2 to 6 fewer carbon atoms than the alpha-olefin which is being recovered in the process. Specific examples of the paraffinic hydrocarbon are pentane, hexane, heptane, octane, nonane, etc. The paraffinic hydrocarbon is employed in an amount of about 0.1 to 10.0, more usually about 0.2 to 1.0 part by volume per unit per volume of complex. The complex can contain from about 1 to 5 percent by weight, more usually about 2 to 4 percent by weight of contaminating alpha-olefin. The treatment of contaminated complex with the paraffinic hydrocarbon can be effected at ambient temperature or at a temperature of about 50° C. to 200° C., more usually about 50° C. to 100° C., depending on the hydrocarbon used. The pressure of the treating operation may vary within the range of subatmospheric, atmospheric and superatmospheric pressure.

The complex material which contains the 2:1 complex is subjected to a heat treatment for a conversion into 1:1 complex and trialkylaluminum. The pyrolysis of the complex can be carried out at a temperature of 110° C. to 225° C., preferably about 130° C. to 190° C. The pyrolysis treatment is preferably accomplished at a subatmospheric pressure which for the purpose of this invention can be about 5 to 30 mm. Hg.

The 1:1 complex can also be used to separate a trialkylaluminum in which the average alkyl radical contains 1 to 5 carbon atoms from non-olefinic hydrocarbon, e.g., the solvent or diluent employed in the growth reaction. The hydrocarbon used as the solvent in the growth reaction is present during the time that the displacement reaction is carried out. The alpha-olefins thus produced are separated from the solvent hydrocarbon and low molecular trialkylaluminum by conventional means, such as, by distillation. The remaining hydrocarbon and low molecular weight trialkylaluminum are then treated with the 1:1 complex described hereinabove to produce a complex material containing 2:1 complex. Upon the formation of the 2:1 complex, two phases will form, one of the solvent hydrocarbon and the other of the complex material. The complex material is then separated from the solvent hydrocarbon and subjected to pyrolysis to regenerate the 1:1 complex in the same manner as described hereinabove in order that it can be reused for treating more mixtures of hydrocarbon and trialkylaluminum.

While the separation process is applicable broadly to non-olefinic hydrocarbons, it is preferably employed in the separation of saturated hydrocarbons from trialkylaluminum. The aromatic hydrocarbons are less frequently employed as diluents or solvents, and these materials are also more difficultly separable, since they may have a degree of miscibility with the 1:1 and 2:1 complexes.

The complex material containing 2:1 complex may be optionally treated with a paraffinic hydrocarbon which is less miscible with the complex material but more miscible with the non-olefinic hydrocarbon which contaminates the same than the complex material. Preferably, the paraffinic hydrocarbon which is employed as a wash material may contain about 5 to 10 carbon atoms, and the hydrocarbon which is used as the growth solvent has more carbon atoms or a higher boiling point than the washing agent. The conditions of treating the mixture of non-olefinic hydrocarbon and low molecular weight trialkylaluminum with the 1:1 complex are the same as described hereinabove for the treatment of the mixture of alpha-olefin and trialkylaluminum. Similarly, the washing of complex material with paraffinic hydrocarbon may be effected under the same conditions as described above in connection with the washing of the complex material which results from the treatment of the mixture of alpha-olefins and trialkylaluminum.

The trialkylaluminum which is employed in and obtained in the growth and displacement reactions is readily partially oxidized in the presence of oxygen, for example, in air. As a result, the growth and displacement products are very often contaminated with small amounts of dialkylaluminum alkoxide. It is also contemplated within the scope of the present invention to separate these alkoxides from trialkylaluminum compounds of low molecular weight by use of the complexing agents.

Olefins can also be prepared by utilizing a dialkylaluminum dialkoxide in the growth reaction in place of a trialkylaluminum. In such a reaction, growth takes place on the two alkyl radicals, with the olefins being displaced therefrom in the displacement reaction.

The trialkylaluminum of low molecular weight may be present in any of the reaction mixtures described above and may be effectively separated therefrom through the process of this invention.

The dialkylaluminum alkoxide to be separated usually has an average of about 2 to 5 carbon atoms for each alkyl radical, and the alkoxide radical contains about 2 to 5 carbon atoms. The mixture may be treated with a 1:1 complex of the type described hereinabove to produce a product consisting of two phases, namely, the upper phase of mono-alkoxide, and the lower phase of complex material containing 2:1 complex. The complex material may be optionally washed and pyrolyzed in the same way as was explained hereinabove in connection with the recovery of trialkylaluminum from either alpha-olefin or non-olefinic hydrocarbon.

In case a displacement catalyst is used for the production of alpha-olefins in the manner described hereinabove, it is undesirable to subject the displacement product to heat, because there is a pronounced tendency for a reverse reaction to occur. The reverse reaction involves the interaction of the alpha-olefins with the low molecular weight trialkylaluminum to yield the high molecular weight growth product. By means of the present invention, the reverse reaction is suppressed, because the displacement product is treated with the 1:1 complex to remove the low molecular weight trialkylaluminum. Thereafter, the alpha-olefin phase containing the catalyst may be subjected to heat, without the fear of the reverse reaction occurring. Nickel and nickel containing catalysts described above are particularly effective in promoting the reverse reaction; hence the present invention has particular application to such a catalytic system.

The following examples are presented in illustration of the invention.

Example I 16.1 grams of triethylaluminum were added dropwise over a five-minute period to a mixture of 15 grams of dodecene and 16.2 grams of dry tetramethylammonium chloride. The temperature of the reaction mixture rose to 59° C.; and upon cooling, the entire mass became solid. The reaction mixture was reheated slowly to a temperature of 100° C., at which point two liquid phases were present. The temperature of the reaction mixture was maintained at the elevated level for a period of two hours to insure completion of the complex reaction. Thereafter, the reaction mixture was cooled slowly, whereupon the lower phase solidified at a temperature of about 47° C. A sample of the upper phase was analyzed and found to be substantially free of aluminum and chloride. The lower phase contained the 1:1 complex of aluminum triethyl and tetramethyl ammonium halide.

The reaction mixture was reheated to a temperature of 70° C., and thereafter, 17.0 gms. of aluminum triethyl were added. The purpose of this part of the experiment was to prepare a 2:1 complex of the two reactants. The temperature of the reaction mixture was held at 70° C. The reaction mixture turned solid with the addition of the first drop of aluminum triethyl and remained solid throughout the addition of aluminum triethyl. The solid melted at a temperature between 85° C. and 95° C. At a 100° C., two liquid phases were present. A sample of the upper phase contained 0.63 weight percent of aluminum and less than 0.1 percent chlorine. The lower phase contained 8.79 weight percent aluminum and 5.88 weight percent chlorine. The aluminum to chlorine mole ratio of the lower phase was 1.97.

Another experiment was made to determine how well the 2:1 complex could be pyrolyzed to produce the 1:1 complex and the trialkylaluminum compound.

Example II 50 gms. of a 2:1 complex of aluminum triethyl and tetramethyl ammonium chloride, in which the mole ratio of aluminum to chloride was 1.99, was charged to a 125 ml. round bottomed flask with a thermal well and a vacuum distillation head separated by a 8-inch glass column. No packing was used in the glass column. The complex was heated to a temperature of 140° C. at 20 mm. pressure before any triethylaluminum began to reflux. The heat was slowly increased until the complex reached a temperature of 150° C. and the pressure was reduced to 1 mm. At the end of 5.25 hours, very little material was coming overhead from the complex. A total of 14.1 gms. of overhead product material was collected. The overhead product was analyzed and found to contain 21.7 percent aluminum and less than 0.1 percent chlorine. The overhead product was aluminum triethyl and was produced in a yield of 72 percent.

To determine the amount of complex that would be retained in the hydrocarbon phase with the use of various types of halides in the complex, the following experiment was performed.

Example III 21.9 gms. of tetramethyl ammonium chloride, 30.8 gms. of tetramethyl ammonium bromide and 40.2 gms. of tetramethyl ammonium iodide each were added to three separate flasks. 79 gms. of a 52.5 weight percent solution of triethylaluminum in n-dodecene were added to each of the three flasks. Each flask was stirred for a 30-minute period at a temperature ranging between 50° C. and 60° C. The phase containing dodecene was separated from each flask. The dodecene was analyzed for aluminum in order to determine how much had been retained therein. In the tabulation given below, the amount of aluminum present in the halogen complex served as a base and all other analyses of aluminum are reported as ratios relative to the base figure.

| Complex: | Analysis [1] of aluminum in dodecene |
|---|---|
| Chloride complex | 1.0 |
| Bromide complex | 1.6 |
| Iodide complex | 5.2 |

[1] The analysis of aluminum is given in terms of the ratio based on the chloride analysis.

It is apparent from the analyses of the aluminum contained in the hydrocarbon phase that the chloride complex gives the best results. The poorest results are obtained with the iodide complex.

In the next experiment, a nickel containing displacement product was subjected to the practice of the present invention to determine whether any adverse effects could be expected.

Example IV

For the displacement catalyst, nickel naphthenate was activated with growth product and then inhibited with 15 parts of propargyl alcohol per part of nickel. The displacement product was treated with the nickel solution in an amount to provide a final concentration of 20 p.p.m. nickel. 1040 gms. of the displacement product were used in this experiment. The displacement product was produced from a growth product in which the $m$ value was 3.7. The nickel containing displacement product was maintained at 15° C. and then 515 gms. of a 1:1 complex of triethylaluminum and tetramethyl ammonium chloride were added thereto. The temperature of the mixture rose to 50° C. and was stirred at that level for a period of 10 minutes. The olefin layer was analyzed at various times to determine the extent to which reverse displacement had occurred. The following tabulation gives the results of this work.

| | Percent reverse displacement | Percent of total olefin (by NMR) | | |
|---|---|---|---|---|
| | | Alpha-olefin | Internal olefin | Pendant olefin |
| 1. Samples of thermal displacement product used | | 92.6 | 1.7 | 5.7 |
| 2. Olefin layer after 10 minutes at 50° C. in the presence of 1.82 ATE/TMAC | 0.5 | 92.6 | 2.5 | 4.9 |
| 3. Olefin layer from 2 after three days' storage at R.T. | | 92.0 | 2.6 | 5.4 |
| 4. Olefin layer from 2 after eleven days' storage at R.T. | | 91.7 | 3.0 | 5.0 |
| 5. Olefin layer from 2 after fourteen days' storage at R.T. | | 91.6 | 2.8 | 5.6 |
| 6. Control sample after 10 minutes at 50° C. (without ATE/TMAC) | 1.5 | 91.7 | 2.3 | 6.0 |

R.T.=room temperature.
NMR=nuclear magnetic resonance.

Example V

In this example, the displacement product contained triethylaluminum, alpha-olefins and dialkylaluminum mono-alkoxide. An excess of the 1:1 complex of triethylaluminum and tetramethyl ammonium chloride was employed to insure complete reaction with all of the aluminum compound which was present in the displacement product. After the complexing reaction, the two phases thus formed were separated. A sample of the olefin layer was subjected to hydrolysis treatment to determine, if any, monoalkoxide was present therein. As to the hydrolysis product, 0.058 mole of alcohol was present in the aqueous layer and 0.045 mole of alcohol was present in the olefin layer. The total of 0.103 mole of alcohol indicated that the aluminum compound was present as dialkylaluminum mono-alkoxide. This experiment also establishes that the complex material does not affect the mono-alkoxide.

Example VI

In this experiment, the layer of complex material resulting from the complexing reaction was washed with normal heptane. For this purpose, 1–2 parts normal heptane per 9 parts of complex material were employed. Essentially all of the olefins contained in the complex material were removed by washing twice with the normal heptane.

Example VII

Complexes produced by the reaction of tetramethylammonium chloride with either triethylaluminum or tributylaluminum were found to be substantially insoluble in the olefins of the displacement product or in 1-decene and normal heptane. However, when tetramethylammonium chloride was complexed with trihexylaluminum, it was found that the complex was partially soluble in the same paraffinic and olefinic materials.

To provide a better understanding of the present invention, reference will now be had to the accompanying drawing which forms a part of this specification.

In the drawing, the 1:1 complex of triethylaluminum and tetramethylammonium chloride is recycled to a storage vessel 5 by means of line 6. Fresh tetramethylammonium chloride and triethylaluminum are separately introduced to storage vessel 5 by means of lines 7 and 8, respectively. The 1:1 complex is withdrawn from the storage vessel 5 by means of line 9 at the rate of 180 pounds per hour. The 1:1 complex is combined with displacement product which is fed through line 10 at the rate of 485 pounds per hour. The combined streams are fed to a complexing vessel 12 through a supply line 13. In the complexing vessel 12, the 1:1 complex combines with the triethylaluminum present in the displacement product and thereby forms a phase of complex material which is superimposed by a phase of olefins and solvent. The solvent which is used in the growth reaction is kerosene having an ASTM initial boiling point of 195° C. and an end point of 225° C. The complex material is withdrawn continuously from the bottom of the complexing vessel at a rate of 276 pounds per hour. The hydrocarbon phase is withdrawn continuously from the top of the complexing vessel 12 through a line 14 at a rate of 389 pounds per hour. The hydrocarbon phase in line 14 is fed to a distillation system 16 in which the various products are separated. The products are discharged from the distillation system 16 by means of line 17.

The complex material which is withdrawn from the complexing vessel 12 passes through line 18, which is interconnected with an olefin extraction vessel 20. In the olefin extraction vessel 20, normal heptane is fed thereto by means of line 21 at the rate of 138 pounds per hour. The complex material is contaminated with olefins and solvent which are removed substantially by means of the normal heptane. In the olefin extraction vessel 20, two phases are formed, namely, the upper hydrocarbon phase and the lower complex phase. The hydrocarbon phase is withdrawn continuously from the olefin extraction vessel 20 by means of line 22 at the rate of 140 pounds per hour. The washed complex material is withdrawn from the olefin extraction vessel 20 by means of line 23 at the rate of 274 pounds per hour. The washed complex material in line 23 is fed to a pyrolysis vessel 25. In the pyrolysis vessel 25, the temperature is maintained at 175° C. and at a pressure of 10 mm. The complex material remains within the pyrolysis vessel 25 for a period of about 2 minutes. As a result, the 2:1 complex is decomposed into the 1:1 complex and triethylaluminum. The triethylaluminum is withdrawn from the pyrolysis zone by means of line 25 at the rate of 83 pounds per hour. The remaining complex material consisting essentially of the 1:1 complex is withdrawn from the pyrolysis vessel 25 by means of line 6 and is recycled to the storage vessel 5 as previously indicated at the rate of 180 pounds per hour.

The regenerated triethylaluminum which leaves the pyrolysis vessel 25 enters the storage vessel 27 then leaves the storage vessel 27 in line 26a and enters the growth reactor 28. Fresh kerosene serving as solvent is charged to the growth reactor 28 by means of line 29 at the rate of 83 pounds per hour. Ethylene is charged to the growth reactor 28 by means of line 30 at the rate of 86 pounds per hour. In the growth reactor, the temperature is maintained at about 100° C. to 120° C. and at a pressure of 1000 to 2000 p.s.i.g. The reaction mixture has a residence time of about 3 hours within the growth reactor. The growth reaction occurs to the extent of providing a Poisson number of 3.7. The growth product is withdrawn from the growth reactor by means of line 31 and is fed to a displacement reactor 32 at the rate of 424 pounds per hour. Fresh ethylene is fed to the displacement reactor 31 by means of line 33 at the rate of 66 pounds per hour. In the displacement reactor 32, the temperature is maintained at about 110 °C. and the pressure at about 500 p.s.i.g. The reaction mass has a residence time of about 5 minutes before it is withdrawn by means of line 10 and then combined with the 1:1 complex which is flowing through line 9. The displacement product is withdrawn from the reactor 32 at a rate of 485 pounds per hour.

It can be seen from the foregoing example that the present invention has unique application for a system in which olefinic materials are produced through the growth reaction. The triethylaluminum which serves as the base upon which the molecule is built up is used continuously in the reaction. Quite unexpectedly, the same triethylaluminum complexes readily with the tetraalkylammonium halide to form a 1:1 complex and with the 1:1 complex to produce a 2:1 complex, both of which are insoluble in the olefinic product material. This provides a simple and economic method of separating the triethylaluminum from the hydrocarbon product material.

Having thus described the invention by providing specific examples thereof, it is to be understood that no undue limitations or restrictions are to be drawn by reason thereof and that many variations and modifications are within the scope of the invention.

We claim:

1. A process which comprises adding to at least one mixture selected from the group consisting of (1) displacement product containing alpha-olefins and low molecular weight trialkylaluminum and (2) saturated hydrocarbon containing low molecular weight trialklaluminum, a complexing agent for said low molecular weight trialkylaluminum selected from the group consisting of $R_nMX$ and complex of $R_nMX$ and low molecular weight trialkylaluminum in a 1:1 molar ratio, wherein R is an alkyl radical having 1 to about 5 carbon atoms; M is an element selected from the group consisting of nitrogen, arsenic, phosphorous, sulfur, selenium, and tellurium; X is a halogen; and $n$ varies from 3 to 4 in an amount sufficient to react with and complex with at least a substantial amount of said low molecular weight trialkylaluminum and separating the formed complex from the remainder of said mixture.

2. A process which comprises adding to at least one mixture selected from the group consisting of (1) displacement product containing alpha-olefins and low molecular weight trialkylaluminum and (2) saturated hydrocarbon containing low molecular weight trialkylaluminum, a complexing agent for said low molecular weight trialkylaluminum selected from the group consisting of tetraalkylammonium halide having alkyl radicals of 1 to about 5 carbon atoms and complex of tetraalkylammonium halide having alkyl radicals of 1 to about 5 carbon atoms and low molecular weight trialkylaluminum in a 1:1 molar ratio, in an amount sufficient to react with and complex with at least a substantial amount of said low molecular weight trialkylaluminum and separating the formed complex from the remainder of said mixture.

3. The process of claim 2 in which said mixture is displacement product.

4. The process of claim 2 in which said mixture is saturated hydrocarbon containing low molecular weight trialkylaluminum.

5. A process which comprises treating a displacement product containing alpha-olefins of about 4 to 30 carbon atoms and trialkylaluminum containing alkyl radicals of about 2 to 5 carbon atoms but having less carbon atoms than the average number of atoms in the alpha-olefins with a complex of a tetraalkylammonium halide having alkyl radicals of about 1 to 5 carbon atoms and a trialkylaluminum in which the alkyl radicals contain about 2 to 5 carbon atoms, the sum of the average number of carbon atoms of the alkyl radicals of the tetraalkylammonium halide and the average carbon atoms of the alkyl radicals of the trialkylaluminum being not greater than about 6, and the molar ratio of trialkylaluminum to halide being 1:1, thereby producing a complex in which the molar ratio is 2:1, and separating the 2:1 complex from the alpha-olefins.

6. The process of claim 5 wherein the 2:1 complex is pyrolyzed to produce a 1:1 complex and trialkylaluminum and reusing the 1:1 complex for treatment of the displaced product.

7. The process of claim 5 wherein the treated displaced product contains two phases, an upper phase of alpha-olefins and a lower phase of 2:1 complex contaminated with alpha-olefin, separating the phases, and treating the contaminated 2:1 complex with a paraffinic hydrocarbon containing about 5 to 12 carbon atoms but having fewer average carbon atoms than the alpha-olefin to remove therefrom the alpha-olefins, then separating the 2:1 complex from the paraffinic hydrocarbon containing alpha-olefin.

8. A process which comprises treating a mixture of trialkylaluminum containing alkyl radicals having an average of about 2 to 5 carbon atoms and a dialkylaluminum mono-alkoxide in the substantial absence of aromatic hydrocarbon solvent with a complex of trialkylaluminum containing alkyl radicals having an average of about 2 to 5 carbon atoms and a tetraalkylammonium halide in which the alkyl radicals contain about an average of about 1 to 5 carbon atoms, the molar ratio of trialkylaluminum to tetraalkylammonium halide being 1:1, thereby producing a phase containing substantially dialkylaluminum mono-alkoxide and a second phase of complex material containing a 2:1 complex of trialkylaluminum to tetraalkylammonium halide, and separating the two phases.

9. The process of claim 8 wherein the tetraalkylammonium halide is tetraalkylammonium chloride.

10. A process which comprises treating a mixture of a paraffinic hydrocarbon made up of molecules containing between about 4 and about 30 carbon atoms and a trialkylaluminum in which the alkyl radicals contain an average of about 2 to 5 carbon atoms with a complex of trialkylaluminum in which the alkyl radicals contain an average of about 2 to 5 carbon atoms and a tetraalkylammonium halide in which the alkyl radicals contain an average of about 1 to 5 carbon atoms, the molar ratio of trialkylaluminum to tetraalkylammonium halide being about 1:1, thereby producing a phase containing substantially all hydrocarbon and another phase containing substantially a complex material including a 2:1 complex of trialkylaluminum and tetraalkylammonium halide, and separating the two phases.

11. A process which comprises adding to a mixture of dialkylaluminum alkoxide and low molecular weight trialkylaluminum in the substantial absence of aromatic hydrocarbon solvent, a complexing agent for said low molecular weight trialkylaluminum selected from the group consisting of a tetraalkylammonium halide having alkyl radicals of 1 to about 5 carbon atoms and a complex of tetraalkylammonium halide having alkyl radicals of 1 to about 5 carbon atoms and low molecular weight trialkylaluminum in a 1:1 molar ratio in an amount sufficient to react with and complex with at least a substantial amount of said low molecular weight trialkylaluminum of said mixture and separating the formed complex from the remainder of said mixture.

References Cited
UNITED STATES PATENTS 3,153,075  10/1964  Kroll _____ 260—448
3,206,522   9/1965  Poe et al. _____ 260—448 X

OTHER REFERENCES

Hein, Fr., et al.: Zeitschrift für Physikalische Chemie, Abt. A, 165 (1933), pages 363–366.

Translation of article by Mario Farina, Gazzeta Chemica Italiana 89 (1959), pages 2, 4 and 11 of translation.

TOBIAS E. LEVOW, *Primary Examiner.*

H. M. S. SNEED, *Assistant Examiner.*